(12) United States Patent
Acker

(10) Patent No.: US 7,051,535 B2
(45) Date of Patent: May 30, 2006

(54) TURBINE ENGINE DIFFERENTIAL-PRESSURE TORQUE MEASUREMENT SYSTEM

(75) Inventor: Bernard N. Acker, Madison, AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 518 days.

(21) Appl. No.: 10/370,296

(22) Filed: Feb. 10, 2003

(65) Prior Publication Data

US 2004/0154385 A1 Aug. 12, 2004

(51) Int. Cl.
F02C 9/00 (2006.01)

(52) U.S. Cl. .................... 60/803; 60/39.282
(58) Field of Classification Search .............. 60/39.282, 60/791, 803
See application file for complete search history.

(56) References Cited

U.S. PATENT DOCUMENTS 4,212,161 A * 7/1980 Newirth et al. .......... 60/39.281
4,228,650 A * 10/1980 Camp ...................... 60/39.091
5,673,559 A * 10/1997 Benson ........................ 60/602
5,775,089 A * 7/1998 Skarvan ........................ 60/773
5,775,090 A    7/1998 Skarvan ..................... 60/39.03

OTHER PUBLICATIONS

Sobey, A.J., and Suggs, A.M., "Control of Aircraft and Missile Powerplants", John Wiley and Sons, New York, 1963, pp. 12–13.*

* cited by examiner

Primary Examiner—Ehud Gartenberg
(74) Attorney, Agent, or Firm—Hay Kyung Chang (57) ABSTRACT

Applicant's Differential-Pressure Torque Measurement System generates the torque signal from a differential gas pressure measured across the power turbine. The gas pressure differential is measured by using two pressure taps, the first tap taking the pressure reading of the expanding gas as the gas travels from the gas-generating turbine to the power turbine of the engine and the second tap taking the pressure reading of the gas as it escapes the engine through the exhaust port. The differential between the two pressure readings is determined. The pressure differential is then input to a processor which processes it in a pre-determined fashion along with the rotational speed signal of the power turbine, initial pressure and the temperature measurements of the air as the air is initially inlet into the engine. The result of the processing are various engine parameter indications including the torque.

22 Claims, 7 Drawing Sheets

TURBINE ENGINE DIFFERENTIAL-PRESSURE TORQUE MEASUREMENT SYSTEM

DEDICATORY CLAUSE

The invention described herein may be manufactured, used and licensed by or for the Government for governmental purposes without the payment to me of any royalties thereon.

BACKGROUND OF THE INVENTION

A typical turbo shaft engine has a mechanical torque sensing device that drives a cockpit indicator so that the pilot or operator can know the power output of the engine. Torque is a critical parameter monitored by pilots and engine operators to control the aircraft or other engines and prevent damage to other drive train components. Most torque meters actually measure the twist in a drive shaft within the engine for torque indication. The accuracy of these torque measurements is affected by the shaft material properties, the temperature of the shaft, the frictional components that support the shaft and the torsional creep of the shaft itself. In addition, deficiencies in the accuracy, resolution, environmental response of the transducer, signal conditioning and computations have a large effect on the measurement accuracy. The cumulative effect of such deficiencies often is a torque indication that is unsatisfactory for smooth, safe and accurately reliable engine control.

One of the means to improve torque accuracy involves characterizing each torque shaft individually against a reference torque measurement system by entering the shaft-specific data into an electronic engine controller. With this shaft-specific data, the electronic engine controller can correct torque sensor signals to account for shaft material properties and operating conditions. Work has been done on improving the materials used for building torque shafts to achieve more uniform material characteristics. Low friction sleeves and bushings have been installed between reference shafts and load-carrying shafts to improve torque meter performance.

Another means for achieving accurate torque reading utilizes algorithms developed to adjust the torque readings to account for temperature variations in the torque meter shaft. Because a typical turbine engine is used to produce varying power output, the internal temperature of the engine changes constantly. This change in temperature causes a change in temperature of the torque meter. As is well-known, when a metal is subjected to changes in temperature, its material properties change which allows the metal to twist a different amount in response to the same applied torque. Corrective algorithms neutralize the effects of the temperature variations. But the use of corrective algorithms necessitates the added complexity of taking shaft temperature measurement or generating a synthesized (i.e. approximated) shaft temperatures and, as a result, reduces system reliability.

In providing torque indication for a helicopter engine, a single pressure tap in front of the power turbine has been used. But this positioning of the single tap cannot account for exhaust system losses or the effects of the dynamics of the helicopter, such as changes in the helicopter speed and the flight attitude that affect the backpressure to the engine. All these aspects tend to reduce the accuracy of the torque measurements.

Because of the general unreliability of many torque sensors, synthesized torque signals are often used by engine control systems as a backup torque signal. Synthesized torque signals are generated by using other engine parameters such as compressor discharge pressure, gas generator speed, turbine inlet temperature or combinations of these and pre-established engine characteristics. Such synthesized torque signals can give an approximate engine torque indications but are plagued with inaccuracies due to off-design operation, engine deterioration from wear and tear and even bleed air extraction in many turbine applications.

SUMMARY OF THE INVENTION

In applicant's Differential-Pressure Torque Measurement System, the torque signal is generated from a differential gas pressure measured across the power turbine. The gas pressure differential is measured by using two pressure taps, one tap positioned on either side of the power turbine. The first tap takes the pressure reading of the expanding gas as the gas travels from the gas-generating turbine to the power turbine of the engine while the second tap takes the pressure reading of the gas as it escapes the engine through the exhaust port. The two pressure readings from the two taps are then input to a differential pressure sensor which determines the differential between the two pressure readings. The pressure differential is, in turn, input to a processor which processes it in a pre-determined fashion along with the rotational speed signal of the power turbine, the initial pressure and the initial temperature measurements of the air as the air is inlet into the engine. The results of the processing are various engine parameter indications including the torque.

Unlike torque-reading methods that use only a single pressure tap, either in front of the power turbine or in the pre-combustion stage, applicant's differential pressure system compensates for any static and dynamic effects caused by the engine exhaust system and for any variation in power turbine speeds from the design operating speed. By using the pressure differential across the power turbine, the torque signal generated is consistent and accurate, because the power turbine deteriorates very little over the life of the turbine engine compared to other components such as the compressor and gas-generating turbine. Thus, the differential pressure system provides a simple, low-cost, lightweight, easy-to-install and accurate torque measurement system that can be used on helicopters, turboshaft-driven fixed-wing aircraft and industrial gas turbine engines.

DESCRIPTION OF THE PREFERRED EMBODIMENT

Referring now to the drawing wherein like numbers represent like parts in each of the several figures, solid lines with arrowheads indicate signal paths and broken lines with arrowheads indicate optional signals and paths, the Turbine Engine Differential-Pressure Torque Measurement System is explained in detail.

Figure 1:
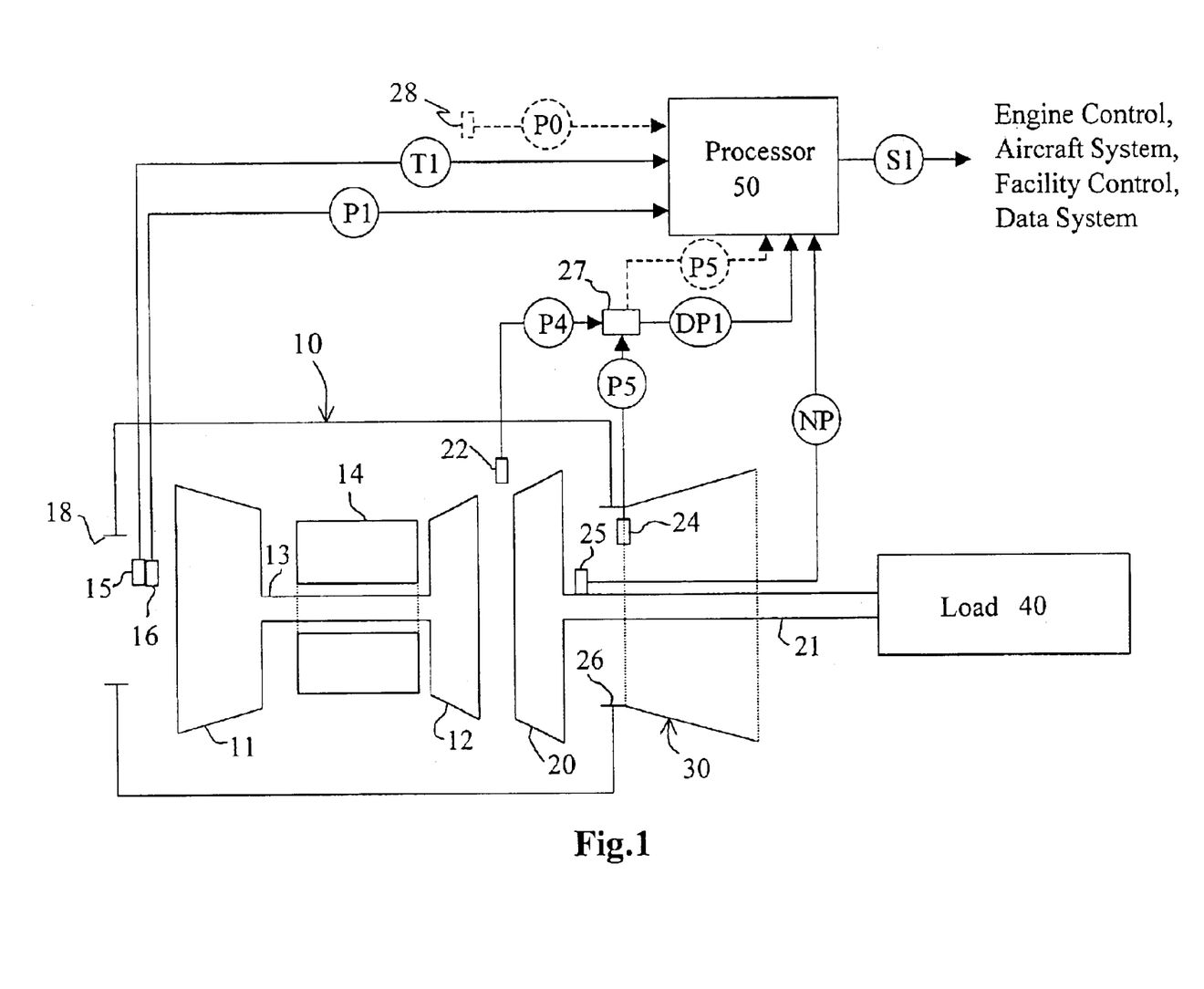
FIG. 1 is a diagram of tire preferred embodiment of the Turbine Engine Differential-Pressure Torque Measurement System.

To facilitate the description of the structure and operation of the Torque Measurement System, the following terms and definitions are used:

DP1=P4–P5: first differential pressure measured, in psi, with differential pressure sensor 27.

DP2=P5–P0: second differential pressure, in psia, across the exhaust system.

P0: ambient air pressure, in psia, measured with ambient air pressure sensor 28.

P1: initial pressure of the inlet air measured, in psia, with pressure sensor 16.

P4: first pressure reading.

P5: second pressure reading.

$$\text{Delta} = \frac{P1}{14.696}:$$

correction factor where 14.696 is in units of psia and is a normalization constant corresponding to standard day sea level pressure.

NP: rotational speed signal, in RPM or %, measured with speed sensor indicating the rotational speed of power turbine 20 and output shaft 21, where NP=100% represents a specific, pre-determined rotational speed. The conversion from RPM to % rotational speed is engine model-specific and is established by the engine manufacturer.

T1: initial temperature of inlet air measured, in degrees Rankine (Degree R), with temperature sensor 15.

$$\text{Theta} = \frac{T1}{518.7}:$$

correction factor where 518.7 is in R and is a normalization constant corresponding to standard day sea level ambient air temperature.

$$NPC = \frac{NP}{\sqrt{\text{theta}}}:$$

NP corrected to T1.

$$DP1C = \frac{DP1}{\text{Delta}}:$$

DP1 corrected to pressure P1.

$$PR1 = \frac{DP2}{P5}:$$

pressure ratio 1, the backpressure to the engine caused by the engine exhaust system SHP: power delivered from the engine to the load (i.e. any device that is powered by the engine), typically in units of shaft horsepower.

$$SHPC = \frac{SHP}{(\text{Delta})(\text{Theta})^{0.50}}:$$

SHP corrected to P1 and T1.

$$Q = \frac{(SHP)(5252.1)}{NP}:$$

torque delivered from the engine to the load, typically in units of foot-pounds (ft-lbs.).

S1: referring collectively to SHP, SHPC and Q.

5252.1: a standard conversion constant used in converting shaft horsepower to torque, Q, based on the rotational speed of the shaft, NP.

FIG. 1 illustrates the Differential-Pressure Torque Measurement System which operates in conjunction with a typical gas turbine engine 10 that has a shaft ouput 21 and provides power to load 40 that is driven by free power turbine 20. Power turbine 20 is free because it does not drive compressor 11, even if it is physically connected to the compressor by, say, bearings. Load 40 can be any controllable device such as an aircraft gearbox that transmits power to rotorblades of a helicopter or the propeller of a propeller-driven fixed-wing aircraft. The device may also be an electrical generator or any other industrial hardware.

In operation of the Differential-Pressure Torque Measurement System, outside air is let into compressor 11 through inlet 18. Adjacent to the inlet are temperature sensor 15 that provides the inlet air temperature measurement T1 and pressure sensor 16 that provides the inlet air pressure measurement P1, both measurements being input to processor 50. The inlet air is compressed by compressor 11 and forwarded to combustor 14 which communicates with the compressor and where fuel is added and ignited. The expanding gasses that result from this combustion turn gas-generating turbine 12 which, in turn, drives connecting shaft 13. Since the connecting shaft connects the gas-generating turbine and the compressor, the action of driving the connecting shaft also drives the compressor. Thus, the compression and combustion cycle is maintained as long as inlet air and fuel are combined at an appropriate ratio to sustain combustion.

The excess expanding gas that remains after the the requirement for compression-combustion sustainment is met leaves gas-generating turbine 12 and enters power turbine 20. On its way, the gas passes first pressure tap 22 which provides first pressure reading P4 to differential pressure sensor 27. Meanwhile, in response to the incoming expanding gas, power turbine 20 turns output shaft 21 to drive load 40. The rotational speed of the power turbine is measured by speed sensor 25 which provides speed signal NP and inputs it directly to processor 50. After the expanding gas departs power turbine 20, it exits engine 10 through exhaust port 26 and duct 30. As the gas exits, its pressure is read by second pressure tap 24, thus providing a second pressure reading P5. P5 is input to differential pressure sensor 27 and may further be input to processor 50. In response to P4 and P5 inputs, the differential pressure sensor produces first differential pressure signal DP1 and inputs DP1 to processor 50.

Figure 2:
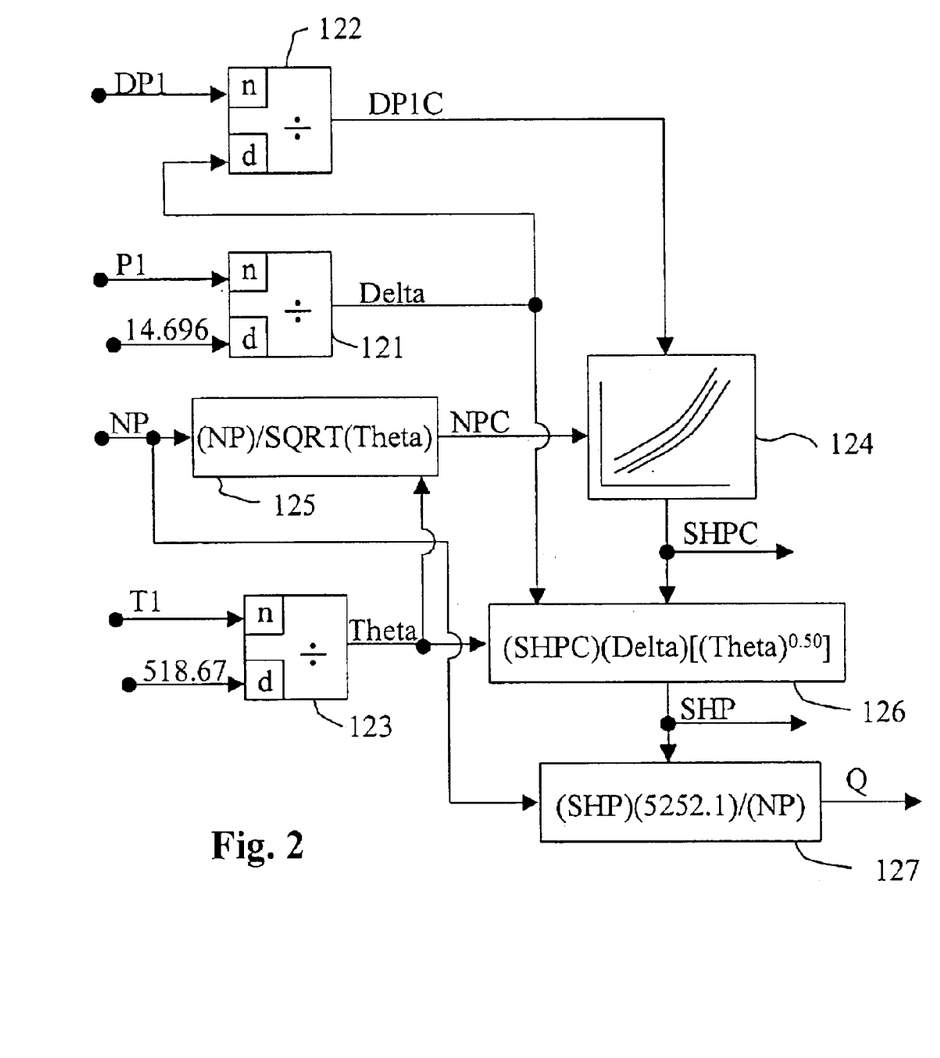
FIG. 2 details the process performed by the processor to generate engine parameters.

FIG. 2 details the process executed by processor 50 to generate engine output parameters S1. The processor can be a subset of an electronic engine controller, a data acquisition system, a facility/system controller/monitor or even a stand-alone electronic device. It may be comprised of analog circuitry, digital circuitry or a combination of both types of circuitry and may be configured in any fashion that may occur to one skilled in the art as long as it is sufficient to perform the process illustrated in FIG. 2.

As represented by FIG. 2, processor 50 comprises a plurality of dividers and product blocks, as well as a means for calculating SHPC, the corrected shaft horsepower value. In operation of the processor, Delta is produced by first divider 121 from the initial pressure measurement P1 of the inlet air as the numerator and first pre-determined normalization constant, 14.696 psia, as the denominator. The Delta value is input to second divider 122 and second product block 126. In turn, second divider 122 utilizes first differential pressure signal, DP1, as the numerator and the Delta as the denominator and produces DP1C, corrected differential pressure signal, and inputs this result to calculating means 124. Third divider 123 utilizes the initial temperature measurement T1 of the inlet air as the numerator and second pre-determined normalization constant, 518.67 R, as the denominator to produce Theta value. The Theta value is input to first product block 125 and second product block 126. Both the Delta and Theta values are standard correction factors used to correct or refer engine parameter data to a pre-defined condition: in this case, sea level standard atmospheric day conditions of 14.696 psia and 59 degree F. or 518.67 degree R. However, depending on the particular environment in which the Turbine Engine Differential-Pressure Torque Measurement System is to be used, different pre-determined normalization constants that correspond to that particular environment should be used to calculate the Delta and Theta values.

Figure 3:
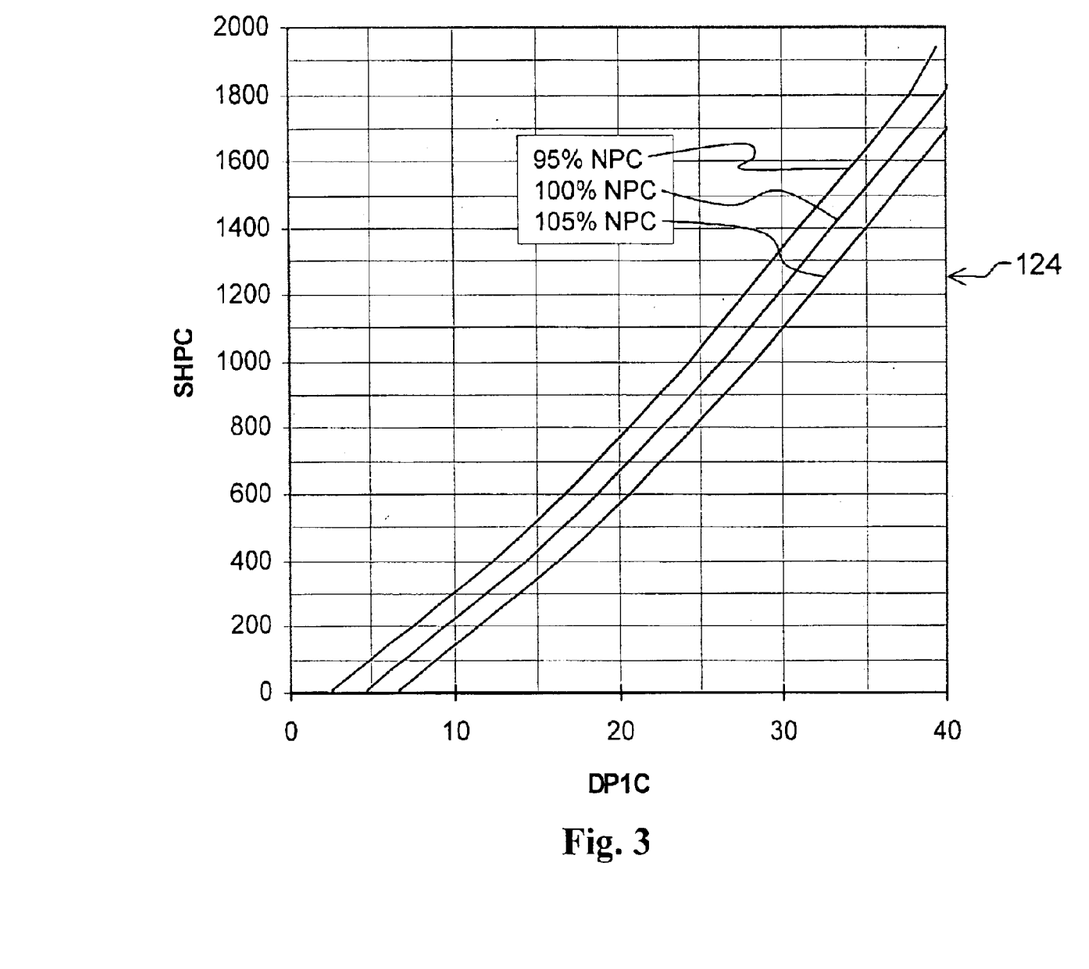
FIG. 3 is a graphic depiction of a representative engine characteristic for the process detailed in FIG. 2.

The Theta value is used, along with NP (the NP being input simultaneously to the first product block 125 and third product block 127), by the first product block to produce NPC according to a formula above mentioned. NPC, in turn, is input to calculating means 124. The calculating means may be a function, either a look-up table or a mathematical equation, that generates the engine parameter SHPC from DP1C and NPC. FIG. 3 graphically depicts the function, showing the SHPC along the vertical axis as a function of DP1C along the horizontal axis. A collection of SHPC v. DP1C curves is shown in terms of NPC. The value of SHPC is input to second product block 126.

SHP is yielded by second product block 126 as a product of the equation, $(SHPC)(Delta)((Theta)^{0.50})$. This equation represents the typical conversion from SHPC to SHP used by engine manufacturers. However, some variations can and do exist. Some engine manufacturers adjust the exponent of Theta to represent the conversion more accurately for their specific engine. For example, a manufacturer may use $SHP=(SHPC)(Delta)((Theta)^{0.537})$ for its conversion. By adjusting the exponent of Theta, the manufacturer can more accurately refer its engine's performance data to a wider range of ambient conditions for a specific model of engine. The equation for a specific engine model may vary thusly, but the process remains the same as long as the engine model-specific equation is inserted in second product block 126. The value of SHP is input to third product block 127.

The third product block outputs the torque value, Q, of engine 10 according to a formula set forth above. The output, S1, of processor 50 enables the operator of load 40 to gauge the capacities of the engine accurately and consequently maintain a precise control of the engine for optimum support of the controllable device.

Figure 4:
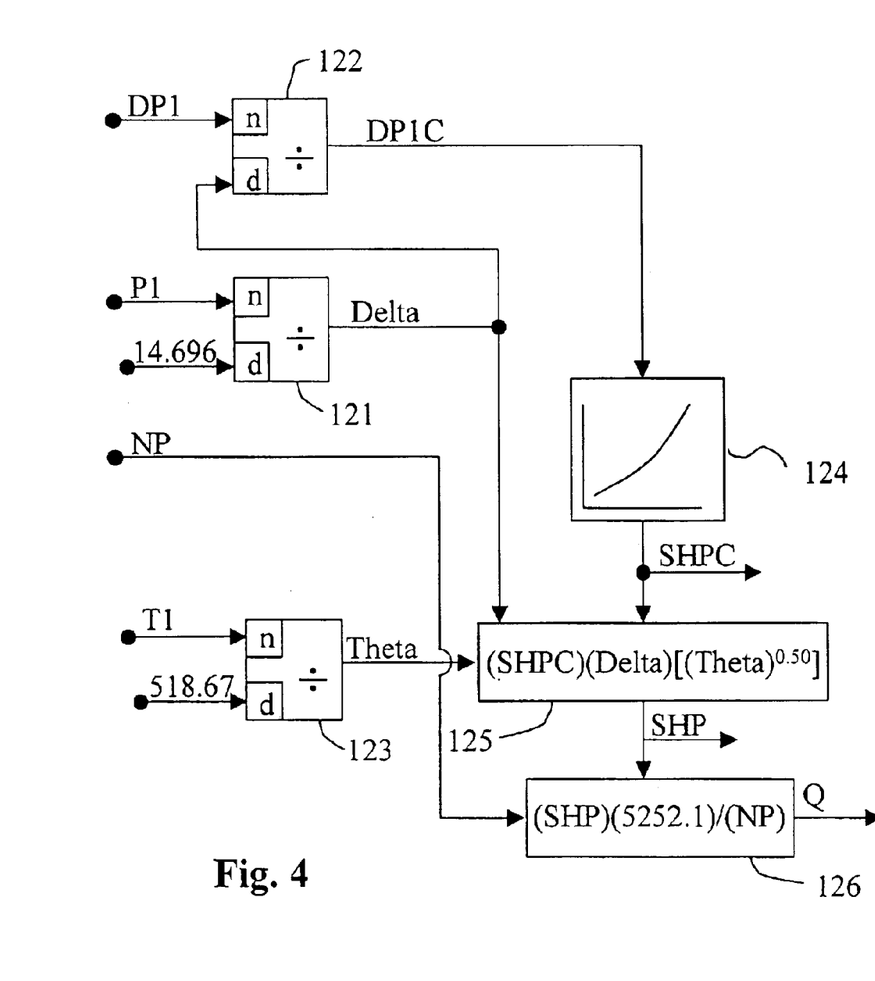
FIG. 4 shows an alternate, simpler process performed by the processor to generate engine parameters.
Figure 5:
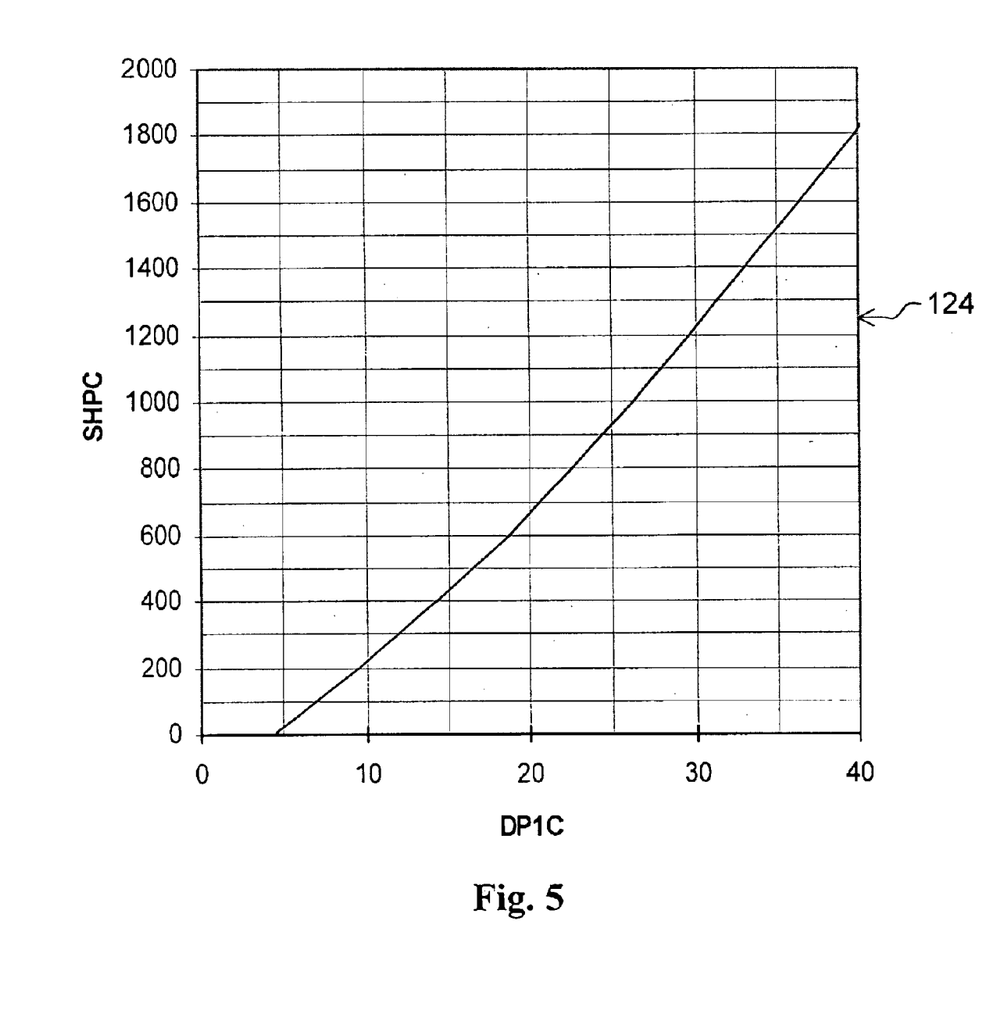
FIG. 5 is a graphic depiction of a representative engine characteristic for the process detailed in FIG. 4.

An alternate, simpler process that can replace the process illustrated in FIG. 2 is shown in FIG. 4. This alternate process is identical to that depicted in FIG. 2 except that it eliminates first product block 125 while still generating SHPC, SHP and Q. The alternate process can be used on engines that run at a constant NP or have torque characteristics insensitive to the allowable changes in NP or on engines where the desired system accuracy can be achieved without compensating for variations in the rotating speed of power turbine 20. As seen in FIG. 5, the alternate process reduces the amount of upfront engine characterization data required. Like the graph in FIG. 3, the graph in FIG. 5 depicts SHPC along the vertical axis as a function of DP1C along the horizontal axis. A single curve of SHPC v. DP1C is shown.

Figure 6:
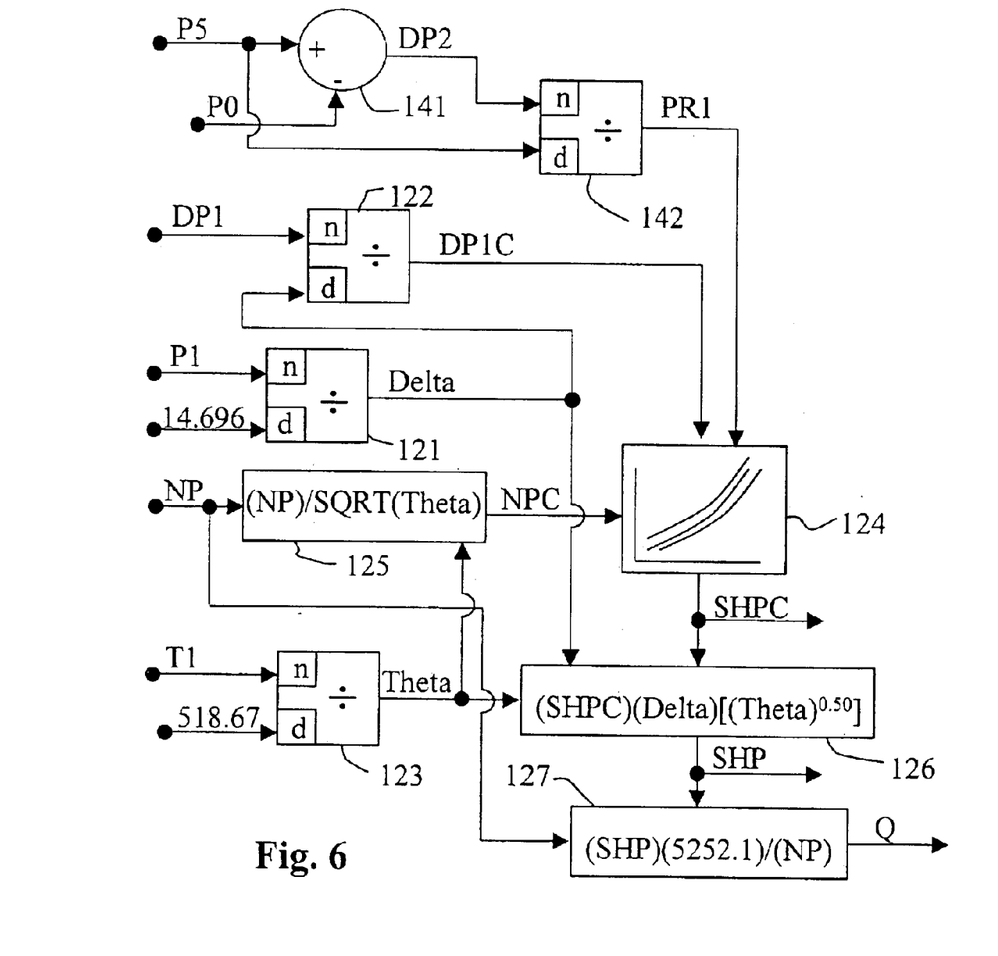
FIG. 6 is a diagram of yet another alternate process performed by the processor, taking into consideration differential pressure across the exhaust system.
Figure 7:
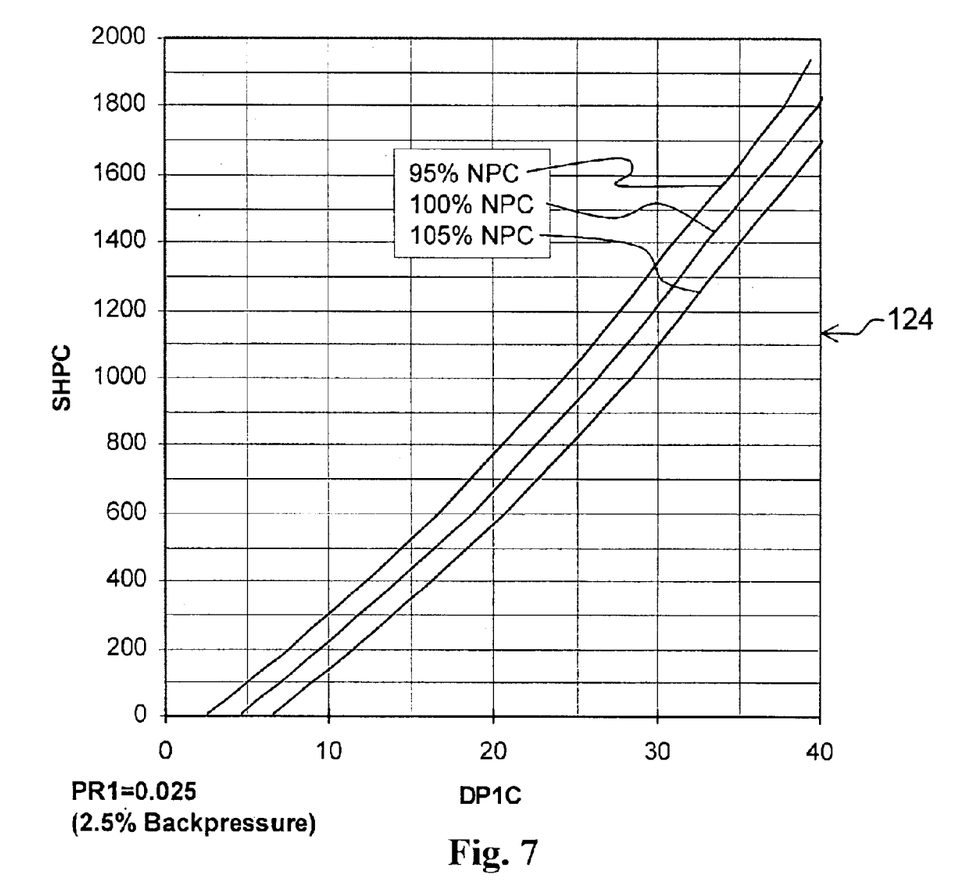
FIG. 7 is a graphic depiction of a representative engine characteristic for the process detailed in FIG. 6.

FIG. 6 shows yet another alternate process that may be performed by processor 50 to generate the engine parameters. This second alternate process is also identical to the process described in FIG. 2 except for the adder 141 and fourth divider 142. The adder combines P0 and P5 to produce second differential pressure signal, DP2, which, then, is input to the fourth divider. The fourth divider utilizes DP2 as the numerator and P5 as the denominator to provide PR1. PR1 is input to calculating means 124 wherein it is processed along with other inputs to produce SHPC. This embodiment may be used on engines that are run at variable NP speeds and when the engine is further susceptible to a variation in exhaust backpressure. When an engine is installed in an aircraft or put to an application with a complex exhaust system, the exhaust backpressure can vary with engine power output. A typical case is an aircraft fitted with engine exhaust infrared suppressors. The variation in backpressure changes the delta pressure across the power turbine and can reduce the accuracy of the embodiments depicted in FIGS. 2 and 4. The embodiment of FIG. 6 compensates for the changes in backpressure at the exit of the power turbine. FIG. 7 shows a collection of SHPC v. DP1PC curves in terms of NPC and a given percent backpressure.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

I claim:

1. A system for accurately measuring parameters of a gas turbine engine output, the gas turbine engine having a power turbine and providing power to a controllable device via an output shaft coupling said device to said engine, said system utilizing a first differential pressure across said power turbine and comprising: a means for measuring the initial temperature and initial pressure of the inlet air entering the gas engine; a combustor and a gas-generating turbine to combust said inlet air and produce expanding gas; a differential pressure sensor; a first pressure tap positioned between said gas-generating turbine and said power turbine, said first tap taking a first pressure reading of said expanded gas as said expanded gas travels from said gas-generating turbine to said power turbine and providing said first pressure reading to said differential pressure sensor, an exhaust port located adjacent to said power turbine to allow said expanded gas to escape said engine upon leaving said power turbine; a second pressure tap positioned in said exhaust port, said second tap taking a second pressure reading of said escaping gas and providing said second pressure reading to said differential pressure sensor, said differential pressure sensor producing a first differential pressure signal in response to said first and second pressure readings; a speed sensor coupled to determine the rotational speed of said power turbine and produce a speed signal; a processor coupled to receive said initial temperature and pressure measurements, said first differential pressure signal and said speed signal and process said measurements and pressure and speed signals to produce an accurate torque signal of said engine, said torque signal being used to maintain a precise control of the power output of said controllable device.

2. A system for accurately measuring parameters of a gas turbine engine output as set forth in claim 1, wherein said processor comprises: a means for calculating a corrected shaft horsepower value; a means for producing a corrected differential pressure signal by correcting said first differential pressure signal to said initial pressure measurement, said corrected differential pressure signal being input to said calculating means; a means for determining a corrected speed signal by correcting said speed signal to said initial temperature, said corrected speed signal being input to said calculating means, said calculating means subsequently processing said corrected differential pressure signal and said corrected speed signal to calculate therefrom said corrected shaft horsepower value; a means for outputting a torque signal of said engine and a means for yielding a shaft horsepower value, said shaft horsepower being indicative of the power delivered from said engine to said controllable device, said yielding means being coupled between said calculating means and said outputting means and receiving said corrected shaft horsepower value from said calculating means and inputting said shaft horse power value to said outputting means.

3. A system for accurately measuring parameters of a gas turbine engine output as set forth in claim 2, wherein said means for producing a corrected differential pressure signal comprises: a first divider coupled to said pressure sensor, said first divider accepting from said pressure sensor said initial pressure measurement to be used as the numerator and utilizing a first pre-determined normalization constant as the denominator and producing therefrom a delta value, said delta value being unitless; and a second divider coupled between said differential pressure sensor, first divider and calculating means for accepting from said differential pressure sensor and said first divider said first differential pressure signal arid said delta value, respectively, and producing therefrom said corrected differential pressure signal, said corrected differential pressure signal being input to said calculating means.

4. A system for accurately measuring parameters of a gas turbine engine output as set forth in claim 3, wherein said means for determining a corrected speed signal comprises: a third divider coupled to said temperature sensor, said third divider accepting from said temperature sensor said initial temperature measurement to be used as the numerator and utilizing a second pre-determined normalization constant as the denominator and producing therefrom a theta value; a first product block coupled between said speed sensor, said third divider and said calculating means, said first product block accepting from said speed sensor and said third divider said speed signal and said theta value, respectively, and producing therefrom said corrected speed signal, said corrected speed signal being input to said calculating means.

5. A system for measuring parameters of a gas turbine engine output as set forth in claim 4, wherein said means for yielding a shaft horsepower value comprises a second product block coupled to receive said delta value from said first divider, said theta value from said third divider and said corrected shaft horsepower value from said calculating means and yielding from said values said shaft horsepower value.

6. A system for measuring parameters of a gas turbine engine output as set forth in claim 5, wherein said means for outputting a torque signal of said engine comprises a third product block coupled to receive said shaft horsepower value from said second product block and said speed signal from said speed sensor and, together with a third pre-determined normalization constant, outputting said torque signal.

7. A system for measuring parameters of a gas turbine engine output as set forth in claim 6, wherein said calculating means comprises: a means calculating said corrected shaft horsepower value as a function of said corrected differential pressure signal.

8. A system for measuring parameters of a gas turbine engine output as set forth in claim 7, wherein said first and second pre-determined normalization constants correspond to standard day sea level pressure and standard day sea level ambient air temperature, respectively.

9. A system for measuring parameters of a gas turbine engine output as set forth in claim 1, wherein said processor comprises: a means for calculating a corrected shaft horsepower value; a means for producing a corrected differential pressure signal by correcting said first differential pressure signal to said initial pressure measurement, said corrected differential pressure signal being input to said calculating means; a means for outputting a torque value of said engine and a means for yielding a shaft horsepower value, said shaft horsepower value being indicative of the power delivered from said engine to said controllable device, said yielding means being coupled between said calculating means and said outputting means and receiving said corrected shaft horsepower value from said calculating means and inputting said shaft horsepower value to said outputting means.

10. A system for measuring parameters of a gas turbine engine output as set forth in claim 9, wherein said means for producing a corrected differential pressure signal comprises: a first divider coupled to said pressure sensors said first divider accepting from said pressure sensor said initial pressure measurement to be used as the numerator and utilizing a first pre-determined normalization constant as the denominator and producing therefrom a delta value, said delta value being unitless; and a second divider coupled between said differential pressure sensor, first divider and calculating means for accepting from said differential pressure sensor and said first divider said first differential pressure signal and said delta value, respectively, and producing therefrom said corrected differential pressure signal, said corrected differential pressure signal being input to said calculating means.

11. A system for accurately measuring parameters of a gas turbine engine output as set forth in claim 10, wherein said processor further comprises: a third divider coupled to said temperature sensor, said third divider accepting from said temperature sensor said initial temperature measurement to be used as the numerator and utilizing a second pre-determined normalization constant as the denominator and producing therefrom a theta value.

12. A system for measuring parameters of a gas turbine engine output as set forth in claim 11, wherein said means for yielding a shaft horsepower value comprises a first product block coupled to receive said delta value from said first divider, said theta value from said third divider and said corrected shaft horsepower value from said calculating means and yielding from said values said shaft horsepower value.

13. A system for measuring parameters of a gas turbine engine output as forth in claim 12, wherein said means for outputting a torque signal of said engine comprises a second product block coupled to receive said shaft horsepower value from said first product block and said speed signal from said speed sensor and, together with a third pre-determined normalization outputting said torque signal.

14. A system for accurately measuring the torque output of a gas turbine engines the gas turbine engine having a power turbine and providing power to a controllable device via an output shaft coupling said device to said engine, said system utilizing a differential pressure across said power turbine and comprising: a means for measuring the initial temperature and initial pressure of the inlet air entering the engine; a gas-generating turbine; a compressor for compressing said inlet air, a combustor to combust said inlet air causing said air to expand, said expanding air entering said gas-generating turbine; a connecting shaft connecting said gas-generating turbine and said compressor, said gas-generating turbine driving said connecting shaft and said compressor in response to said expending gas; a differential pressure sensor; a first pressure tap positioned between said gas-generating turbine and said power turbine, said first tap taking a first pressure reading or said expanded gas as said expanded gas travels from said gas-generating turbine to said power turbine and providing said first pressure reading to said differential pressure sensor; an exhaust port located adjacent to said power turbine to allow said expanded gas to escape said engine upon leaving said power turbine; a second pressure tap positioned in said exhaust port, said second tap taking a second pressure reading of said escaping gas and providing said second pressure reading to said differential pressure sensor, said differential pressure sensor producing a first differential pressure signal in response to said first and second pressure readings; a speed sensor coupled to determine the rotational speed of said power turbine and produce a speed signal; an ambient air pressure sensor for determining the ambient air pressure signal; a processor coupled to receive said ambient air pressure signal, initial temperature and pressure measurements of said inlet air, said first differential pressure signal and said speed signal and process said measurements and signals to determine the torque output of said engine, said torque being used to maintain a precise control of said controllable device.

15. A system for accurately measuring the torque output of a gas turbine engine as set forth in claim 14, wherein said processor comprises: a means for calculating a corrected shaft horsepower value; a means for producing a corrected differential pressure signal by correcting said first differential pressure signal to said initial pressure measurement, said corrected differential pressure signal being input to said calculating means; a means for determining a corrected speed signal by correcting said speed signal to said initial temperature, said corrected speed signal being input to said calculating means, said calculating means processing said corrected differential pressure signal and said corrected speed signal to calculate therefrom said corrected shaft horsepower value; a means for outputting a torque value of said engine and a means for yielding a shaft horsepower value, said shaft horsepower being indicative of the power delivered from said engine to said controllable device, said yielding means being coupled between said calculating means and said outputting means and receiving said corrected shaft horsepower value from said calculating means and inputting said shaft horsepower value to said outputting means.

16. A system for accurately measuring the torque output of a gas turbine engine as set forth in claim 15, wherein said means for producing a corrected differential pressure signal comprises: a first divider coupled to said pressure sensor, said first divider accepting from said pressure sensor said initial pressure measurement to be used as the numerator and utilizing a first pre-determined normalization constant as the denominator and producing therefrom a delta value, said delta value being unitless; and a second divider coupled between said differential pressure sensor, first divider and calculating means for accepting from said differential pressure sensor and said first divider said first differential pressure signal and said delta value, respectively, and producing therefrom said corrected differential pressure signal, said corrected differential pressure signal being input to said calculating means.

17. A system for accurately measuring the torque output of a gas turbine engine as set forth in claim 16, wherein said processor further comprises: an adder, said adder being coupled to said ambient air pressure sensor and said second pressure tap to receive therefrom said ambient air pressure signal and said second pressure reading of said escaping gas, respectively, and, in response, produce a second differential pressure signal.

18. A system for accurately measuring the torque output of a gas turbine engine as set forth in claim 17, wherein said means for determining a corrected speed signal comprises: a third divider coupled to said temperature sensor, said third divider accepting from said temperature sensor said initial temperature measurement to be used as the numerator and utilizing a second pre-determined normalization constant as the denominator and producing therefrom a theta value; a first product block coupled between said speed sensor, said third divider and said calculating means, said first product block accepting from said speed sensor and said third divider said speed signal and said theta value, respectively, and producing therefrom said corrected speed signal, said corrected speed signal being input to said calculating means.

19. A system for accurately measuring the torque output of a gas turbine engine as set forth in claim 18, wherein said processor still further comprises: a fourth divider coupled between said second pressure tap, adder and calculating means, said fourth divider receiving from said second pressure tap and said adder said second pressure reading and said second differential pressure signal, respectively, and determining therefrom a pressure ratio said pressure ratio being indicative of the backpressure caused by the engine exhaust.

20. A system for accurately measuring the torque output of a gas turbine engine as set forth in claim 19, wherein said means for yielding a shaft horsepower value comprises a second product block coupled to receive said delta value from said first divider, said theta value from said third divider and said corrected shaft horsepower value from said calculating means and yield from said values said shaft horsepower value.

21. A system for accurately measuring the torque output of a gas turbine engine as set forth in claim 20, wherein said means for outputting a torque signal of said engine comprises a third product block coupled to receive said shaft horsepower value from said second product block and said speed signal from said speed sensor and, together with a third pre-determined normalization constant, output said torque signal.

22. A system for accurately measuring the torque output of a gas turbine engine as set forth in claim 21, wherein said calculating means comprises: a look-up table depicting said corrected shaft horsepower value as a function of said corrected differential pressure signal or a mathematical equation designed to calculate said corrected shaft horsepower value when given a corrected differential pressure signal.

* * * * *